US005762687A

United States Patent [19]

Grossmann

[11] Patent Number: 5,762,687

[45] Date of Patent: Jun. 9, 1998

[54] PROCESS AND DEVICE FOR DISSOLVING A QUANTITY OF GAS IN A FLOWING LIQUID QUANTITY

[75] Inventor: Holger J. Grossmann, Hamburg, Germany

[73] Assignee: Otto Tuchenhagen GmbH & Co. KG, Büchen, Germany

[21] Appl. No.: 436,300

[22] PCT Filed: Sep. 18, 1993

[86] PCT No.: PCT/EP93/02527

§ 371 Date: May 12, 1995

§ 102(e) Date: May 12, 1995

[87] PCT Pub. No.: WO94/11097

PCT Pub. Date: May 26, 1994

[30] Foreign Application Priority Data

Nov. 19, 1992 [DE] Germany .......................... 42 38 971.2

[51] Int. Cl.[6] ............................ B01D 19/00; B01F 3/04

[52] U.S. Cl. ............................ 95/185; 55/257.4; 95/204; 95/261; 96/216; 261/DIG. 7; 261/DIG. 27; 426/477

[58] Field of Search ................................ 261/76, DIG. 7, 261/DIG. 26, 29, 36.1, DIG. 27; 55/242, 257.4; 95/204, 158, 185, 261; 96/204, 208–210, 216; 426/477

[56] References Cited

U.S. PATENT DOCUMENTS

| | | | |
|---|---|---|---|
| 547,816 | 10/1895 | Stewart | 261/76 |
| 655,727 | 8/1900 | Murphy | 261/DIG. 7 |
| 3,256,802 | 6/1966 | Karr | 55/242 X |
| 3,313,093 | 4/1967 | Guggenberger et al. | 261/DIG. 7 |
| 3,572,550 | 3/1971 | Colomina et al. | 261/DIG. 7 |

(List continued on next page.)

FOREIGN PATENT DOCUMENTS

| | | |
|---|---|---|
| 909115 | 4/1946 | France . |
| 2123649 | 9/1972 | France . |
| 2530484 | 1/1984 | France . |

(List continued on next page.)

OTHER PUBLICATIONS

D. Mewes, "Simulation of a Loop–Type Bubble Column into which Gas is Introduced from the top and Measurement of Hydrodynamic Parameters," Chem.–Ing.–Tech. 64 (1992), No. 8, p. 762.

Haffmans, $CO_2$ Analyser and Controller, Type AGM–05, Undated.

*Primary Examiner*—Richard L. Chiesa
*Attorney, Agent, or Firm*—Lane, Aitken & McCann

[57] ABSTRACT

The invention relates to a process for solution of a quantity of gas in a flowing quantity of liquid, in particular for solution of CO2 gas in beer, a flow of liquid and a flow of gas being combined and the gas in the liquid being dispersed, mixed with, and a part of it being mixed in the liquid. The object of the invention is to increase the amount of gas actually soluble in a liquid under certain conditions in comparison to prior art processes. In addition, the device for application of the process is to be simple in structure, cleanable in continuous flow (CIP-compatible), and its adaptation to specific practical requirements and its control are to be as simple as possible. From the process engineering viewpoint this is accomplished by guiding the gas/liquid mixture into curved paths, as a result of which separation into a bubblefree liquid flow (L1*) and a gas/liquid flow (G*/L2) to be recirculated. The device for application of the process is characterized in that a separating unit (6) is provided in which separation of undissolved gas bubbles from the liquid is accomplished by centrifugal forces in the rotating liquids, the mixing unit (5) or the solution section (5*a*) discharging into an inlet (6*a*) of the separating unit (6), and an extended pipeline section (1*b*) of the pipeline (1) for the bubblefree liquid flow (L1*) being connected to the outlet (6*b*) of the separating unit (6) and the return line (7) for the remaining gas/liquid flow (G*/L2) being connected to an area of the top of the separating unit (6).

15 Claims, 2 Drawing Sheets

U.S. PATENT DOCUMENTS

| | | | |
|---|---|---|---|
| 3,765,318 | 10/1973 | Mazza | 261/DIG. 7 |
| 3,780,198 | 12/1973 | Pahl et al. | 426/477 |
| 3,811,663 | 5/1974 | Sterlini | 261/29 X |
| 3,877,358 | 4/1975 | Karr | 261/DIG. 7 |
| 3,900,420 | 8/1975 | Sebba | 261/DIG. 26 |
| 4,483,826 | 11/1984 | Louthan | 261/DIG. 27 |
| 4,584,002 | 4/1986 | Cox et al. | 261/DIG. 26 |
| 4,766,001 | 8/1988 | Mizandjian et al. | 426/477 |

FOREIGN PATENT DOCUMENTS

| | | |
|---|---|---|
| 398640 | 7/1924 | Germany . |
| 1915135 | 3/1965 | Germany . |
| 2537126 | 3/1976 | Germany . |
| 2934483 | 3/1980 | Germany . |
| 3920472 | 1/1991 | Germany . |
| 1589306 | 5/1981 | United Kingdom . |
| 8802276 | 4/1988 | WIPO . |

Fig.2
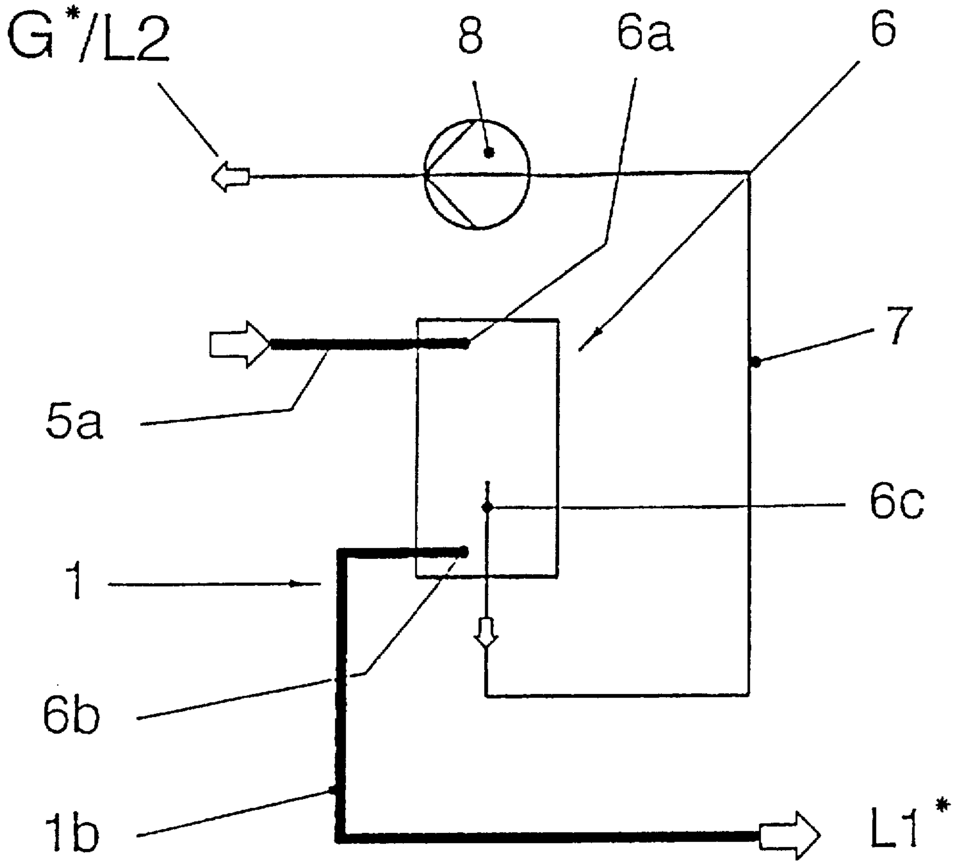
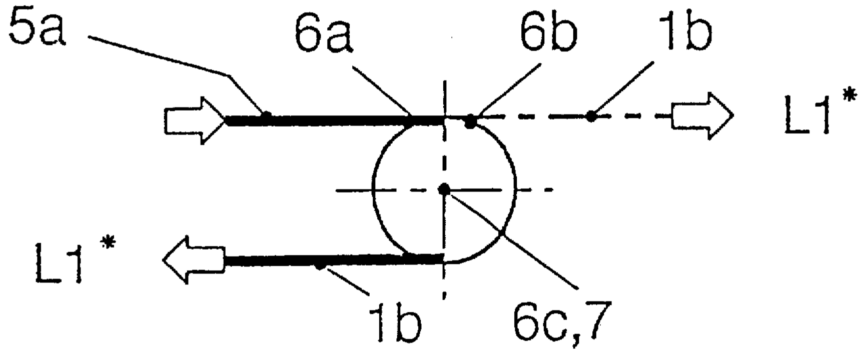
Fig.2a

PROCESS AND DEVICE FOR DISSOLVING A QUANTITY OF GAS IN A FLOWING LIQUID QUANTITY

BACKGROUND OF THE INVENTION

The invention relates to a process for solution of a quantity of gas in a quantity of flowing liquid and a system for application of the process.

A process of the type indicated above and a system for application of the process are from WO-A-8802276. The separation unit used in the known device features a partition permeable to bubblefree liquids, said partition retaining gas bubbles in the circulating liquid.

Another device that documents the state of the art for solution of a quantity of gas in a quantity of flowing liquid is known, for example, from the commercial publication "Haffmans $CO_2$ Measurement and Control System," Model AGM-05, made by Haffmans B. V., RD Venlo, the Netherlands, pages 2 to 5. In the device described in this publication, $CO_2$ gas and beer are brought together in a so-called carbonizing unit in order to apply the process. In this instance a $CO_2$ line ends in the center of a beer line and the $CO_2$ gas is distributed by way of static mixing elements. In a solution section connected downstream from the carbonizing unit additional static mixing elements perform the function of maintaining the distribution of bubbles, a prerequisite for reaching the goal of mass transfer (absorption of gas by liquid).

The process engineering and fluid mechanical prerequisites for gas/liquid mass transfer are sufficiently well known. The gas must be introduced into the liquid, dispersed in it, and distributed uniformly over the cross-section through which the liquid flows. The so-called equilibrium curve, the solution balance of gas and liquid, yields the maximum amount of gas soluble in the liquid at a given line pressure and given temperature. The amount of gas resulting from solution equilibrium can in theory be dissolved in the liquid only over an interval of infinite length if it is offered to the liquid in precisely this amount. Consequently, achievement of solution equilibrium is generally rejected in practical applications and selection of the proper variable operating parameter ensures that a sufficient concentration gradient will arise between the equilibrium concentration (as well as saturation concentration) and the actual concentration which is ultimately established. It is also sufficiently well known that absorption is complicated by low pressure, high temperature, high theoretical concentration of the gas to be dissolved, and, very generally speaking, low rate of flow. The pressure loss in the static mixer and in the solution section connected to it leads, at least gradually, to constantly decreasing static pressure over the flow path, and it is this pressure which determines the local equilibrium concentration. Reduction of the latter leads in turn to decrease in the effective concentration gradient, which is decisive in determining the mass transfer.

Inasmuch as the known devices serve the purpose of solution of a given quantity of gas in a specific amount of flowing liquid with sufficiently well known means, no advantages from the viewpoint of process engineering or apparatus are to be obtained with this device.

In his search for a process and device for intensification of mass transfer, ones with which the obtainable mass transfer can be improved in the above-named carbonizing unit in conjunction with the downstream solution section, the specialist encounters in the journal Chem.-Ing.-Tech 64 (1992), No. 8, page 762, a study on the subject of "Simulation of a Loop-type Bubble Column into which Gas is Introduced from the Top and Measurement of Hydrodynamic Parameters." The following statement, among others, is made in the study:

"Use is made increasingly of stream-driven loop-type bubble reactors to apply gas to low-viscosity liquids in the chemical industry and in biological waste water treatment. The gas and the liquid are introduced into a compact reactor through a two-component nozzle mounted on the top of the reactor. This nozzle may be used in both ejector operation and injector operation. The mixture of gas and liquid introduced through the two-component nozzle flows together downward in the circulation pipe with the two-phase mixture drawn in from the annulus. Part of the liquid is drawn off at the bottom of the reactors. The other part of the liquid flows upward with the gas in the annulus. Part of the gas is discharged at the top of the reactor, while the other part again participates in circulation in the reactor together with the liquid."

Loop-type bubble reactors are to be understood to mean devices in which at least one specifically directed circulation of a fluid or fluidized system including the entire flow takes place. A continuous flow may be superimposed on the circulating flow, this resulting in the flow pattern of a "loop." There are loop reactors with internal circulation and ones with external circulation.

Transfer of the loop reactor principle outlined concisely above to a process of the kind described at the outset cannot be done directly. For one thing, discharge of part of the gas introduced at the top of the reactor, something that cannot be fully eliminated, is undesirable and disadvantageous. The goal set is rather actually to dissolve the quantity of gas introduced, as a result of which the balance of substances established is the simplest one conceivable. In addition, the fixed geometric relationships of the loop reactor permit only to a limited extent adaptation of the process to variable operating conditions. To be added to this is the fact that a loop reactor, regardless of whether operated with internal or external circulation, especially when used in the food and beverage industry, where biologically flawless cleaning of a reactor is extremely important, for one thing is not a particularly cleaning-friendly or CIP (cleaning in place) adapted device, and for another must, if classification is called for, cannot be classified as a pressure vessel which must meet specific safety engineering requirements making it subject to approval or monitoring. This situation makes the device a priori equipment intensive and costly.

DE 39 20 472 A1 discloses a process for specific charging of a liquid with a gas in which the charging process is essentially ended at a specific point in the flow path by coalescence of the gas bubbles not yet dissolved. Coalesced gas bubbles which are not dissolved are either dispersed again and mixed further along the flow path of the liquid to be dissolved and mixed in the latter or they are separated from the liquid. The prior art device for application of the process in question provides for this purpose a separation unit at the end of the charging section in which separation of undissolved gas bubbles from the liquid is accomplished by centrifugal forces in the rotating liquid. This separation unit is represented by a vessel in which the rotating liquid forms a paraboloid of rotation, by way of whose free surface the undissolved gas bubbles are separated (column 4, lines 37 to 51). On the basis of these relationships the flow of substance separated represents a pure gas flow concerning the subsequent use of which there are no indications.

SUMMARY OF THE INVENTION

It is the object of this invention to increase the quantity of gas actually soluble in a liquid under given conditions in comparison to processes of the prior art. In addition, the device used for application of the process is to be simple in design and susceptible of cleaning in the process of flow (that is, CIP capable), and its adaptation to specific practical operational requirements and its control are to be as simple as possible.

Separation of the total flow by subjecting it to guidance of flow into curved paths, into a bubblefree flow of liquid and a gas/liquid flow formed as a two-phase flow makes certain first of all that no uncontrollable additional gas charging takes place in the liquid starting at the separation position. Secondly, separation is a prerequisite for recirculation of a partial flow. The recirculated gas/liquid flow is superimposed as circulation flow on the flow of liquid not charged or charged with gas introduced which forms the continuous flow. The recirculation provides the possibility of redispersing the undissolved gas bubbles contained in the circulation flow and distributing them uniformly in the total flow. In addition, the concentration gradient is increased at the point of combination of continuous and circulation flows and increased turbulence additionally results there from superimposition of the two flows.

In contrast to prior art aeration and gas charging processes (the Haffmans device described concisely above is representative of this type of embodiment), all of which content themselves with striving for solution of a gas and accordingly with achievement of a lower actual concentration of the gas to be dissolved or which require a relatively lengthy mixing and solution section, and accordingly one involving high pressure losses, in the case of the subject of this application the principle of operation, separation of the undissolved gas component from the liquid and repeated recirculation, is applied consistently, in such a way that the undissolved gas component is separated from the bubblefree liquid flow by means of a particularly effective separation mechanism in the form of a two-phase flow (gas/liquid flow).

It has proved to be advantageous from the viewpoint both of process engineering and of the device employed, as is provided by and embodiment of the process claimed for the invention, for the gas flow to be introduced into the recirculating gas/liquid flow. When this is done, first of all dispersion of the recently introduced gas flow occurs. On the other hand, the equipment intensity can be reduced in comparison to a device in which the gas flow is introduced directly into the pipeline, since the return line receiving the recirculating gas/liquid flow always has a rated cross-section smaller than that of the pipeline section carrying the flow of liquid not charged with gas.

In accordance with another advantageous embodiment of the process proposed, the gas in the recirculating gas/liquid flow is at least to some extent redispersed in its carrier liquid before being combined with the liquid flow charged or not charged with gas (continuous flow). This measure contributes to additional improvement in the mass transfer.

In order to intensify and force the separation into a bubblefree liquid flow and a gas/liquid flow, another embodiment of the process claimed for the invention provides that the combined gas/liquid mixture is subjected to direction into curved paths and the energy of rotation required for this purpose is withdrawn from the energy of the flowing gas/liquid mixture, with the result that the equipment required for application of this step of the process is relatively simple.

Since the device employed as embodiment of the process may be designed as simple pipelines both in the area of the continuous and total flow and that of recirculating flow, extremely cleaning-friendly and accordingly CIP-compatible flow and equipment areas are obtained which contain no pressure vessels as required by the pertinent regulations. The core of the device claimed for the invention is a separating unit in which separation of undissolved gas bubbles from the liquid is accomplished by means of centrifugal forces; the mixing unit or solution stretch discharges into an inlet of the separating unit, and an extended pipeline section of the pipeline is connected to an outlet of the separating unit for the bubblefree and the return line for the remaining gas/liquid flow is connected to an area of the top of the separating unit. With the second feed unit mounted in the recirculation line the gas in the gas/liquid flow to be recirculated can, in keeping with the process engineering measures already proposed in the foregoing, be at least partly redispersed in its carrier liquid in a particularly simple and effective manner and be evenly distributed there over the return line cross-section, before being combined with the flow of liquid charged or not charged with gas. This further improves the mass transfer. The proposed system can then be controlled in the simplest manner conceivable by the second feed unit, so that the system can be very easily adapted to changed operating conditions.

By designing the separation unit as a centrifugal force separator, in a first embodiment as a hydrocyclone, as is provided by another design of the proposed device, the total flow can be separated into a bubblefree continuous flow and a circulating flow designed as a two-phase flow (gas/liquid flow) in a an especially easy but extremely effective manner. In this instance the return line is connected to the immersion tube of the hydrocyclone.

When the separation unit is designed as a hydrocyclone, under certain operating conditions so-called "spout formation" may take place as a result of which part of the gas being concentrated in the core of the vortex is carried along into the outlet mounted coaxially with the separating unit. Special structural arrangements must then be made in the outlet so that the gas can be retained in the separating unit, at least up to a certain degree of charging of the liquid with gas, and be removed exclusively by way of the outlet of the two-phase flow (gas/liquid flow).

The separation efficiency is improved even with liquids extremely heavily charged with gas in comparison to embodiment of the separating unit as a hydrocyclone if this unit, as is provided by another advantageous arrangement according to the invention, is designed as a vessel into which the inlet discharges and out of which the outlet discharges, continuing in the direction of flow, and over whose frontal periphery on the outlet side an immersion tube extends a certain distance into the interior of the vessel in the direction of the axis and concentrically with the jacket of the vessel, the immersion tube being connected to the return line on the other side. In this embodiment both the outlet and the inlet are mounted in the jacket area of the vessel, as a result of which preferably the gasfree liquid rotating in this area can be removed. The liquid highly charged with gas rotating in the center, in the area of the axis of the vessel, is able now to leave the separating unit only by way of the immersion tube in the form of the two-phase flow (gas/liquid flow). It is essential in this circumstance for the immersion tube to be mounted in the area of the separating unit on the outlet side so as to make available to the gas/liquid mixture flowing through the vessel the dwell time required for separation of the gas bubbles from the jacket area into the axial area of the vessel.

A very simple and efficient separating unit is obtained when the vessel is designed as a slim cylinder, its cylinder jacket having a height H significantly greater than its diameter D, preferably with a H/D ratio of 3 to 6.

It has been found to be especially efficient with respect to redispersion and uniform distribution of the gas bubbles not yet dissolved in the gas/liquid flow to be returned when, as is provided by another embodiment of the proposed device, the second feed unit is designed as a self-priming centrifugal pump, preferably a side channel pump. Self-priming centrifugal pumps are relatively simple in design; they can deliver both a two-phase mixture and pure gas; they are self-cleaning; and they suffer no abrasion and accordingly require little maintenance.

BRIEF DESCRIPTION OF THE DRAWING

Exemplary embodiments of the device for application of the proposed process are presented and concisely explained below with reference to the figures of the drawing.

FIG. 2 presents a second exemplary embodiment of the device for application of the process according to the invention, the separating unit being designed on the basis of an especially advantageous embodiment according to the invention, and FIG. 2*a* shows a top view of the separating unit shown in FIG. 2 with connections for inlet, outlet, and immersion tube.

DETAILED DESCRIPTION OF THE PREFERRED EMBODIMENT

Figure 1:
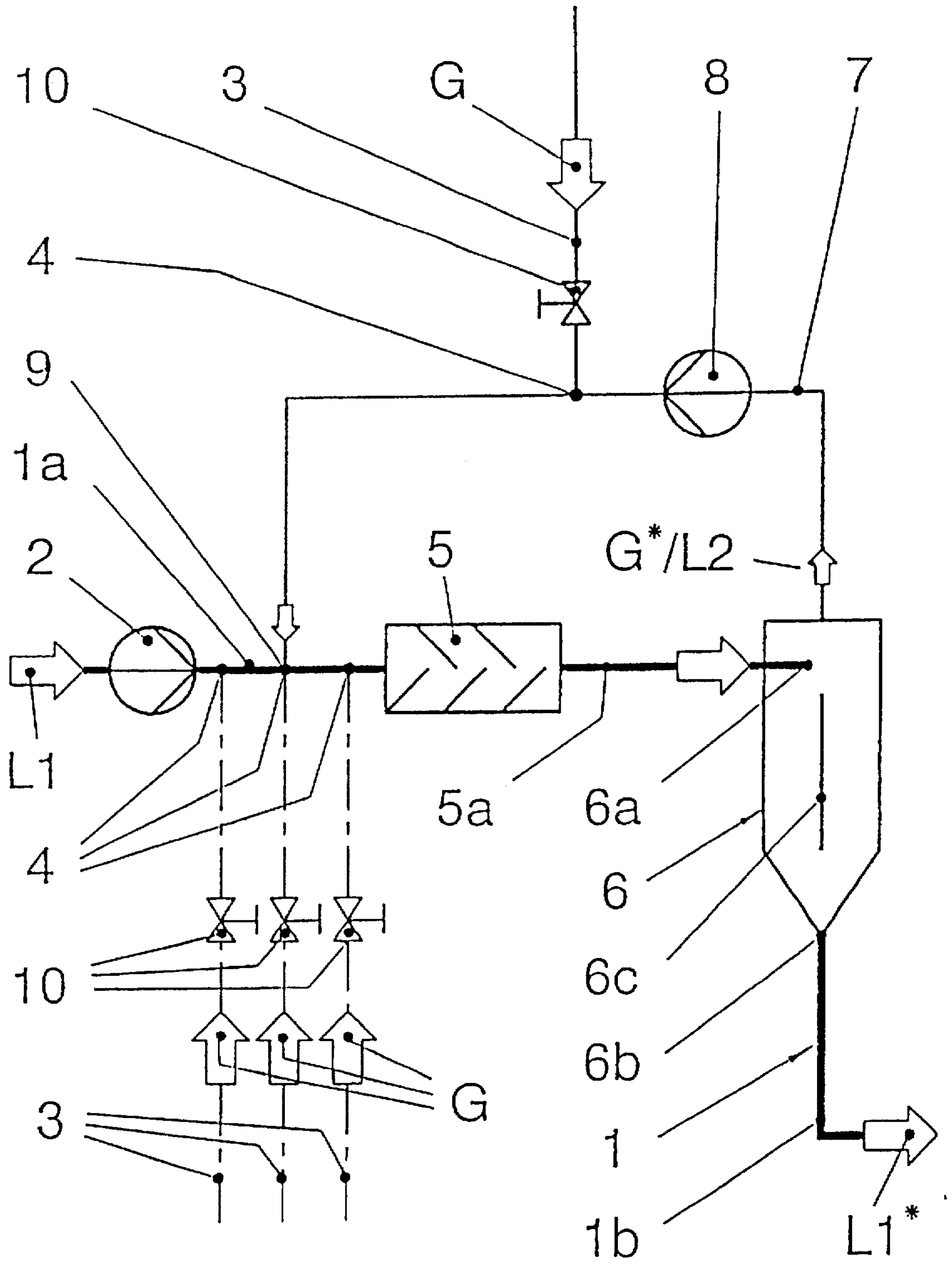
FIG. 1 presents a diagram of a first exemplary embodiment of the device for application of the process according to the invention, with a separating unit designed as a hydrocyclone.

The device (FIG. 1) consists of a pipeline 1, consisting of pipeline sections 1*a* and 1*b*. Pipeline section 1*a* discharges into a static mixing unit 5 to which a solution section is connected if required. The entire mixing and solution unit may also consist exclusively of one solution section 5*a*. The static mixing unit 5 may consist of an individual static mixer or a mixing element or of several static mixers mounted in series; they are designated below as "static mixer 5." Static mixer 5 or solution section 5*a* is connected to an inlet 6*a* of a mixing unit 6 in which it is claimed for the invention separation of the gas/liquid mixture into a gas/liquid and a bubblefree flow of liquid takes place. Pipeline 1 is continued behind separating unit 6 by way of an outlet 6*b* mounted in the area of the bottom of the mixing unit in pipeline section 1*b*. In the area of the top of separating unit 6 a return line 7 is connected which enters the interior of separating unit by way of an immersion tube 6*c* and which on the other side discharges into pipeline section 1*a* at a second inlet point 9.

In a first embodiment according to the invention, one which is especially advantageous because the design of the equipment is especially simple, a gas line 3 performing the function of delivery of gas G, one which extends by way of a metering unit 10, discharges by way of an inlet point 4 into return line 7 beyond a feed unit 8 mounted in the latter. In relation to the direction of flow the inlet point 4, as is provided by other embodiments of the device claimed for the invention, may be mounted before or beyond the second inlet point 9 (the part of gas line 3 discharging at inlet point 4 denoted by broken lines).

A separating unit 6 in the form of a cylindrical vessel (FIG. 2) has a tangentially mounted inlet 6*a* and a tangentially mounted outlet 6*b* from the vessel extending in the direction of flow. This is clearly to be seen in the top view of the separating unit 6 (FIG. 2*a*). The looping angle (as viewed in a cross-sectional plane of the vessel) which the inlet 6*a* and outlet 6*b* occupy relative to each other is of no consequence to the operation of the separating unit 6. The only decisive requirement is that the swirling flow in the vessel be smooth and so can be forced into outlet 6*b* in the direction of flow. Nor is it important in operation of the separating unit whether the latter is mounted vertically, horizontally, or in any oblique position in space relative to the axis of its vessel. It is, however, essential for the immersion tube 6*c* to extend over the frontal periphery of the vessel of the separating unit 6 on the outlet side and a certain distance into the interior of the vessel in the direction of the axis and concentrically with the jacket of the vessel, the immersion tube being connected to the return line 7 on the other side. Inlet 6*a* and outlet 6*b* of the separating unit 6 are similarly incorporated into the overall arrangement, as is the case with the device shown in FIG. 1 and already described.

A gasfree quantity of liquid L1 (liquid phase) is introduced over pipeline section 1*a* (see FIGS. 1, 2, and 2*a*) and is fed through the device by the first feed unit 2, which may be a centrifugal pump, the quantity of liquid L1 forming so-called continuous flow. A quantity of gas G (gas phase) is introduced by way of gas line 3. The gas flow G can be adjusted by means of metering device 10, which is generally in the form of a flow control valve. At inlet point 4 into return line 7 of the gas line gas/liquid flow G*/L2 in the form of a two-phase flow is combined with gas flow G; at least part of the total gas component G+G* can subsequently be redispersed in its carrier liquid L2 by return line 7. At the second inlet point 9 the gasfree liquid flow L1 is combined in pipeline section 1*a* with gas/liquid flow (G+G*)/L2 in return line 7; as the two flows then pass through the static mixer 5 and solution section 5*a* connected to it, if applicable, they complete the desired mass transfer with each other.

In addition to liquid flow L1 (continuous flow), static mixer 5 and solution section 5*a* if provided admit the flow present in return line 7. As a result of the embodiment of separating unit 6 claimed for the invention, gas/liquid flow G*/L2 formed as two-phase flow is present in return line 7. This flow forms the so-called circulating flow superimposed on continuous flow L1 inside pipeline 1 between second inlet point 9 and separating unit 6. A bubblefree liquid flow L1* (liquid phase) is discharged by way of outlet 6*b* of separating unit 6 connected to pipeline section 1*b*. Since under certain operating conditions second feed unit 8 must feed both bubblefree liquid L2 and pure gas G* in addition to two-phase flow G*/L2, it is expedient for this feed unit to be in the form of a self-priming centrifugal pump, preferably a side-channel pump. It is obvious that the second feed unit 8 may also be replaced by a different pump, as for example a rotating positive-displacement pump, in particular an impeller pump, or jet pump, provided that they possess the required delivery characteristics.

The devices illustrated in FIGS. 1 to 2*a* for application of the proposed process are particularly well suited for so-called carbonization of beer. The term carbonization of beer denotes enrichment of beer with $CO_2$; the brewing art today calls for complete solution of a given amount of $CO_2$ in a specific quantity of beer. Hence the design criteria for a carbonization system such as this are assurance of a specific $CO_2$ concentration in the beer and complete, that is, bubblefree, solution.

Similar carbonization requirements arise in other areas of the food and beverage industry, where liquids (citrus beverages and soft drinks, among others) are to be enriched with a very specific content of $CO_2$.

The operating principles underlying the proposed process, to which the increase in the actually bubble free soluble amount of gas, the extent of which could not have been expected, have already been discussed in the foregoing.

I claim:

1. A process for solution of a quantity of gas in a quantity of flowing liquid, wherein a first liquid flow (L1) and a gas flow (G) are introduced and combined, the gas being dispersed in and mixed with the liquid to form a flowing gas/liquid mixture, and part of the gas being dissolved in the liquid; a bubblefree liquid flow (L1*) is then separated from the gas/liquid mixture in a separating unit and removed from the separating unit through a first line opening into the separating unit; a flow (G*/L2) of the gas/liquid mixture remaining after the separation of the bubblefree liquid flow is recirculated through a second line opening into the separating unit and combined with the first liquid flow (L1 or L1/G), wherein said second line is separate from said first line, the recirculated flow of the gas/liquid mixture comprising gas dispersed in a carrier liquid; and gas bubbles are redispersed in the gas/liquid mixture, wherein the flowing gas/liquid mixture is subjected to guidance of flow into curved paths, as a result of which the separation into the bubblefree liquid flow (L1*) and the flow (G*/L2) of the remaining gas/liquid mixture to be recirculated takes place.

2. A process according to claim 1, wherein the gas flow (G) is introduced into the recirculating gas/liquid flow (G*/L2).

3. A process according to claim 1, wherein the gas (G*/G+G) in the recirculating gas/liquid flow (G*/L2 or (G+G*)/L2) is at least partly redispersed in its carrier fluid (L2) before being combined with the first liquid flow (L1;L1/G).

4. A process according to claim 1, wherein the energy of rotation required for guidance of flow along curved paths is generated from the energy of the flowing gas/liquid mixture.

5. A process according to claim 1, wherein the gas is $CO_2$ and the liquid is beer.

6. A device for application of a process for solution of a quantity of gas in a quantity of flowing liquid, wherein a first liquid flow (L1) and a gas flow (G) are introduced and combined, the gas being dispersed in and mixed with the liquid to form a flowing gas/liquid mixture, and part of the gas being dissolved in the liquid, a bubblefree liquid flow (L1*) is then separated from the gas/liquid mixture, a flow (G*/L2) of the gas/liquid mixture remaining after the separation of the bubblefree liquid flow is recirculated and combined with the first liquid flow (L1 or L1/G), the recirculated flow of the gas/liquid mixture comprising gas dispersed in a carrier liquid, and the gas bubbles are redispersed in the gas/liquid mixture, wherein the flowing gas/liquid mixture is subjected to guidance of flow into curved paths, as a result of which the separation into a bubblefree liquid flow (L1*) and the flow (G*/L2) of the remaining gas/liquid mixture to be recirculated takes place, the device comprising a first inlet point (4) for the gas (G) into the first flowing liquid (L1), a first feed unit (2) in a section (1*a*) of a pipeline (1), with a mixing unit (5) positioned downstream of the first feed unit, and wherein a separating unit (6) is provided in which separation of undissolved gas bubbles is accomplished by means of centrifugal forces in the rotating liquid, the separating unit having an inlet, a first outlet line through which the bubblefree liquid flow is removed from the separating unit, and a second outlet line through which the gas/liquid mixture is removed from the separating unit, said first and second outlet lines being separate from one another, and said first and second outlet lines each opening into the separating unit, the mixing unit (5) discharging into the inlet (6*a*) of the separating unit (6), an extended pipeline section (1*b*) and the pipeline (1) for the bubblefree liquid flow comprising the first outlet line (6*b*) of the separating unit (6), and a return line (7) for the remaining gas/liquid flow (G*/L2) being connected between the second outlet line and the pipeline (1) at a second inlet point (9) between the first feed unit and the mixing unit, a second feed unit being provided in the return line.

7. The device according to claim 6, wherein the separating unit (6) comprises a hydrocyclone and the return line (7) is connected to its immersion tube (6*c*).

8. The device according to claim 6, wherein the separating unit (6) comprises a vessel into which inlet (6*a*) discharges tangentially and out of which the outlet (6*b*) discharges tangentially, an immersion tube (6*c*) extends over the frontal periphery of the vessel of the separating unit (6) on the outlet side and a certain distance into the interior of the vessel in the direction of the axis and concentrically with the jacket of the vessel, the immersion tube (6*c*) being connected to the return line (7) on the other side.

9. The device according to claim 8, wherein the vessel comprises a cylinder with a cylinder jacket having a height (H) significantly greater than its diameter (D).

10. The device according to claim 6, wherein the second feed unit (8) comprises a self-circulating centrifugal pump.

11. The device according to claim 10, wherein the self-circulating centrifugal pump is a side-channel pump.

12. The device according to claim 6, wherein the second feed unit (8) comprises a rotating positive-displacement pump.

13. The device according to claim 12, wherein the rotating positive-displacement pump is an impeller pump.

14. The device according to claim 6, wherein the inlet point (4) in the return line (7) is arranged behind the second feed unit (8) or in a pipeline section (1*a*).

15. The device according to claim 14, wherein the inlet point in the return line is in front of, beyond, or in the second inlet point.

* * * * *